United States Patent
Mantyla (10) Patent No.: US 7,065,680 B2
(45) Date of Patent: Jun. 20, 2006

(54) METHOD AND A SYSTEM FOR EVALUATING THE RELIABILITY OF A PROGRAM IN AN ELECTRONIC DEVICE, AND AN ELECTRONIC DEVICE

(75) Inventor: Janne Mantyla, Espoo (FI)

(73) Assignee: Nokia Corporation, Espoo (FI)

( * ) Notice: Subject to any disclaimer, the term of this patent is extended or adjusted under 35 U.S.C. 154(b) by 554 days.

(21) Appl. No.: 10/464,106

(22) Filed: Jun. 17, 2003

(65) Prior Publication Data

US 2003/0237028 A1 Dec. 25, 2003

(30) Foreign Application Priority Data

Jun. 20, 2002 (FI) .................................. 20021214

(51) Int. Cl.
*G06F 11/00* (2006.01)
*G06F 11/36* (2006.01)

(52) U.S. Cl. ............................ 714/49; 714/53; 714/38; 717/126

(58) Field of Classification Search .................. 714/49, 714/53, 54; 717/124, 126
See application file for complete search history.

(56) References Cited

U.S. PATENT DOCUMENTS

| | | | | |
|---|---|---|---|---|
| 5,493,649 A | * | 2/1996 | Slivka et al. .................. 714/48 |
| 5,822,517 A | * | 10/1998 | Dotan .......................... 726/22 |
| 5,944,821 A | | 8/1999 | Angelo |
| 6,021,510 A | * | 2/2000 | Nachenberg .................. 714/38 |
| 2001/0027524 A1 | * | 10/2001 | Krauter et al. .............. 713/200 |

* cited by examiner

*Primary Examiner*—Scott Baderman
*Assistant Examiner*—Joseph Schell
(74) *Attorney, Agent, or Firm*—Alfred A. Fressola; Ware, Fressola, Van Der Sluys & Adolphson LLP (57) ABSTRACT

A method and associated system and electronic device for evaluating the reliability of a program (401) stored in a storage memory of an electronic device (1) having a processing memory (3b) for processing programs, wherein the program (401) is loaded into the processing memory (3b) for processing, wherein a first determining step determines data about the loading address of the program (401), a modification step searches for a program corresponding to the program (401) in the storage memory (4, 10), wherein if the searched program is found, the program code of the searched program is modified to correspond to the loading of the program in the loading address determined in the first determining step. An examining step examines the conformity of the program loaded in the processing memory and the modified program, wherein the result of the examining step is used in the evaluation of the reliability of the program (401) to be verified.

23 Claims, 5 Drawing Sheets

METHOD AND A SYSTEM FOR EVALUATING THE RELIABILITY OF A PROGRAM IN AN ELECTRONIC DEVICE, AND AN ELECTRONIC DEVICE

CROSS-REFERENCE TO RELATED APPLICATIONS

This application claims priority under 35 USC §119 to Finnish Patent Application No. 20021214 filed on Jun. 20, 2002.

FIELD OF THE INVENTION

The present invention relates to a method for evaluating the reliability of a program in an electronic device with at least a processing memory for processing of software, said program being stored in a storage memory, in which method the program is loaded in said processing memory for processing. The invention also relates to a system for evaluating the reliability of a program in an electronic device with at least a processing memory for processing of programs, and means for loading the program in said processing memory for processing, and which system comprises means for storing the program in a storage memory. Furthermore, the invention relates to an electronic device comprising means for evaluating the reliability of the program, a processing memory for the processing of programs, and means for loading the program in said processing memory for processing, and a program corresponding to the program to be checked being stored in the storage memory. The invention also relates to a storage means containing program commands to be processed in the electronic device, to evaluate the reliability of the program loaded in the processing memory of the electronic device, said program being stored in the storage memory, and which electronic device comprises means for loading the program in said processing memory for processing.

BACKGROUND OF THE INVENTION

A variety of electronic devices apply programmable control means, such as microprocessors, microcontrollers, programmable logics, and/or application-specific programmable integrated circuits. Such electronic devices contain stored software consisting of one or more programs containing e.g. program commands required for the operation of the electronic device. In the storage of such software, a memory is used, of which at least a part is a non-volatile memory, i.e. the content of the memory is retained even if the operating voltage of the memory is cut off. These memories include for example a read-only memory (ROM), a programmable ROM (PROM) and an electrically erasable PROM (EEPROM). At least a part of the memory is normally integrated in the electronic device, but in addition, the memory can be increased in many applications by means of, for example, a memory expansion board, or by using a storage means outside the device, such as a data network or the like. One such memory expansion board is the so-called Flash memory card. The Flash memory is a kind of EEPROM type memory whose content can be changed by electrical programming. The contents of the Flash memory will be retained even after the cutting off of the operating voltages. By means of such an expansion memory, it is easy to provide the electronic device with new software, memory capacity for storing, for example, photographs in a digital camera, for setting access rights e.g. in a mobile station, etc.

The installation of software in an electronic device can also be performed, in a way known as such, by using other storage means, such as a diskette, a CD-ROM, or a DVD, or possibly directly from a data network.

To run a program, it is typically loaded in the memory of the electronic device, after which the processor of the electronic device starts to run the program code, preferably under control by the operating system. In multi-run operating systems, the operating system alternates the processing of different programs being run, wherein each program being run is typically processed for a given time, after which another program is in turn for processing. The processing time allocated for different programs may vary. If there are several processors, it is possible to process several processing threads in parallel.

The programs may consist of one or more program blocks which are preferably stored as files of their own in a permanent memory, for example on a diskette, a fixed disk, a Flash memory, a data network, or the like. Furthermore, so-called library programs are known, to which several different programs or only one program can have access, wherein the program code may comprise a call to a library program. During the running of a program, the processing is, for a moment, shifted to the library program, after which the processing is continued from the program, which is called the library program. Such library programs typically include programs of general use to implement, for example, the displaying of data on the display of the electronic device. Thus, the compiler of the program does not need to compile the commands needed for controlling the display in the program, but it is possible to define a call to a library program in the program and, in connection with the call, to determine the parameters possibly needed by the library program.

Some electronic devices, such as computers and wireless communication devices, are used more than before to perform such operations, in which the programs used must be reliable. Such operations include, for example, the attending of bank errands, such as the payment of bills, the subscription of products and/or services, the transmission of confidential data in encrypted form, signing, etc. In this context, reliability means, for example, that the programs must not contain an unreliable program code, such as so-called viruses, which might alter the running of the program. A virus or another unreliable program may change the processing of the program without the user noticing anything different from the normal. Thus, for example in a situation, in which the user wants to make a payment, for example to pay the licence of a music piece subscribed via the network, the user starts a program intended for making payments in the electronic device. The program or a library program used by the program may be affected by a virus, wherein the operation of the program no longer corresponds to the original. On the other hand, there are virus programs which may affect the operation of other programs to be run in electronic devices without altering a part in the program related to the payment event or the library program. The virus may thus be activated somewhere in a program being processed in the so-called background, such as in a calendar application. In said payment event, the virus program may, for example, wait until the payment program writes the sum to be paid on the display of the electronic device, and upon detecting this, reduces the sum to be displayed, changes the recipient of the payment, or the like. However, the amount of the original sum is debited from the user's account, although the user believes that the charge was lower and was forwarded to the correct recipient of the payment.

A solution has been developed to the above-presented problem, where known signs of virus programs, or so-called fingerprints, are searched for in the memory of the electronic device. These fingerprints are a kind of parts of the program code, which are typical for a given virus program or a virus program type. However, the number of virus programs is already so large that it is almost impossible to search for all virus programs on the basis of such fingerprint identification. Furthermore, the method requires that the fingerprint data are updated in the electronic device as often as possible, even several times a day, to keep the data as up-to-date as possible.

Another solution is that for each program to be installed in the electronic device, a check digit is computed by a suitable algorithm, such as a cryptographically strong hash algorithm. In the computing of such a hash algorithm, the program code of the program is used. The check digit is stored in the electronic device in connection with the installation of the program. The storing must take place in such a way that it is made sure that the check digit cannot be changed. In connection with the starting of the program, the check digit is compared with a reference digit computed for the program in a corresponding way. If the check digit and the reference digit are the same, it is assumed that the program is reliable, and the program is loaded in the memory of the electronic device and the running of the program is started. However, in practice, there will be situations in which the checking performed at the stage of loading the program will not be sufficient. For example, even several months may have passed since the loading of the program before the checking is made. Thus, the reliability of the software loaded in the memory also should be checked. This checking is necessary in connection with starting of e.g. a payment program or another such program, for whose reliable operation it is absolutely important that there are no unreliable programs in the memory of the electronic device. To check the reliability of a program loaded in the memory, it is usually not possible to use said computing of the reference digit. This is due to the fact that the program normally contains such parts of the program code whose content must be changed in connection with the loading according to the part of the memory where the program is loaded at the time. Such variable parts include, for example, the memory addresses, the absolute jump addresses and links in the program. Thus, the computation of the reference digit will no longer give the same result, so that even though the program was not changed to be unreliable, the comparison between the check digit and the reference digit will not give the same result.

SUMMARY OF THE INVENTION

It is an aim of the present invention to provide an improved method for evaluating the reliability of programs loaded in the memory of an electronic device. The invention is based on the idea that a first reference digit is computed for the program to be checked and loaded in the memory; a second reference digit is computed for a program corresponding to the memory loaded in the memory and stored in the storage memory, by using in the computation for the program the loading address where the program is stored in the memory, and making a comparison between said first and second reference digits. Thus, for an unchanged program, the same value is obtained for both the first and the second reference digit. When computing the second reference digit, the program is not loaded in a memory, but only the parts of the program code, which are dependent on the loading address, are set to correspond to the loading address where the program is actually stored in the memory. To put it more precisely, the method according to the present invention is primarily characterized in that the method comprises at least the following steps:
  a first determining step to determine data about the loading address of said program to be checked in the processing memory,
  a modification step to search for a program corresponding to said program to be checked in the storage memory, wherein if the searched program is found, the program code of the searched program is modified to correspond to the loading of the program in the loading address determined in the first determining step, and
  an examining step to examine the conformity of the program loaded in the processing memory and the modified program, wherein the result of the examining step is used in the evaluation of the reliability of the program to be checked.

The system according to the present invention is primarily characterized in that the system comprises:
  means for determining data about the loading address of said program to be checked in the processing memory,
  means for searching for a program corresponding to said program to be checked, in the storage memory, and for modifying the program code of the searched program to correspond to the loading of the program in the loading address determined in the first determining step, and
  examining means for examining the conformity of the program loaded in the processing memory and the modified program, wherein the result of the examining step is arranged to be used in the evaluation of the reliability of the program to be checked.

The electronic device according to the present invention is primarily characterized in that the electronic device comprises:
  means for determining data about the loading address of said program to be checked in the processing memory,
  means for searching for a program corresponding to said program to be checked, in the storage memory, and for modifying the program code of the searched program to correspond to the loading of the program in the loading address determined in the first determining step, and
  examining means for examining the conformity of the program loaded in the processing memory and the modified program, wherein the result of the examining step is arranged to be used in the evaluation of the reliability of the program to be checked.

Furthermore, the storage means according to the present invention is primarily characterized in that the storage means comprises program commands for taking the following steps:
  a first determining step to determine data about the loading address of said program to be checked in the processing memory,
  a modifying step, in which a search for a program corresponding to said program to be checked is made in the storage memory, wherein if the searched program is found, the program code of the searched program is modified to correspond to the loading of the program in the loading address determined in the first determining step, and
  an examining step, in which the conformity of the program loaded in the processing memory and the modified program is examined, wherein the result of the examining step is used in the evaluation of the reliability of the program to be checked.

The present invention shows remarkable advantages over solutions of prior art. In the method according to the invention, it is possible to check the reliability of a program loaded in a memory, because in the method, the program stored in the memory is compared with a reliable program stored in a storage memory so that the program in the storage memory is subjected to a modification of addresses similar to that made when the program was loaded in the memory. Thus, the points of the program code, which are dependent on the loading address of the program, are taken into account in the computation of the reference digits. Thus, the loading address of the program is not significant as such. By the method of the invention, it is possible to detect even such changes affecting the reliability of the program, which have been entered in the program code after it has been loaded in the memory of the electronic device. Consequently, the use of the electronic device for performing operations, which require reliable software, is safer than the use of solutions of prior art.

DESCRIPTION OF THE DRAWINGS

In the following, the invention will be described in more detail with reference to the appended drawings, in which.

DETAILED DESCRIPTION OF THE INVENTION

The following is a description on the operation of an electronic device 1 according to an advantageous embodiment of the invention in connection with the method of the invention. The electronic device 1 used can be any electronic device, which contains means 2 for running programs, such as a processor 2a. Advantageously, the electronic device 1 comprises operating system software or the like, by which the essential functions of the electronic device are controlled and by which the running of other programs (applications) can be controlled in the electronic device 1. Some non-restrictive examples of such electronic devices 1 to be mentioned in this context include a wireless communication device, such as Nokia 9210i Communicator, and a computer.

Figure 1:
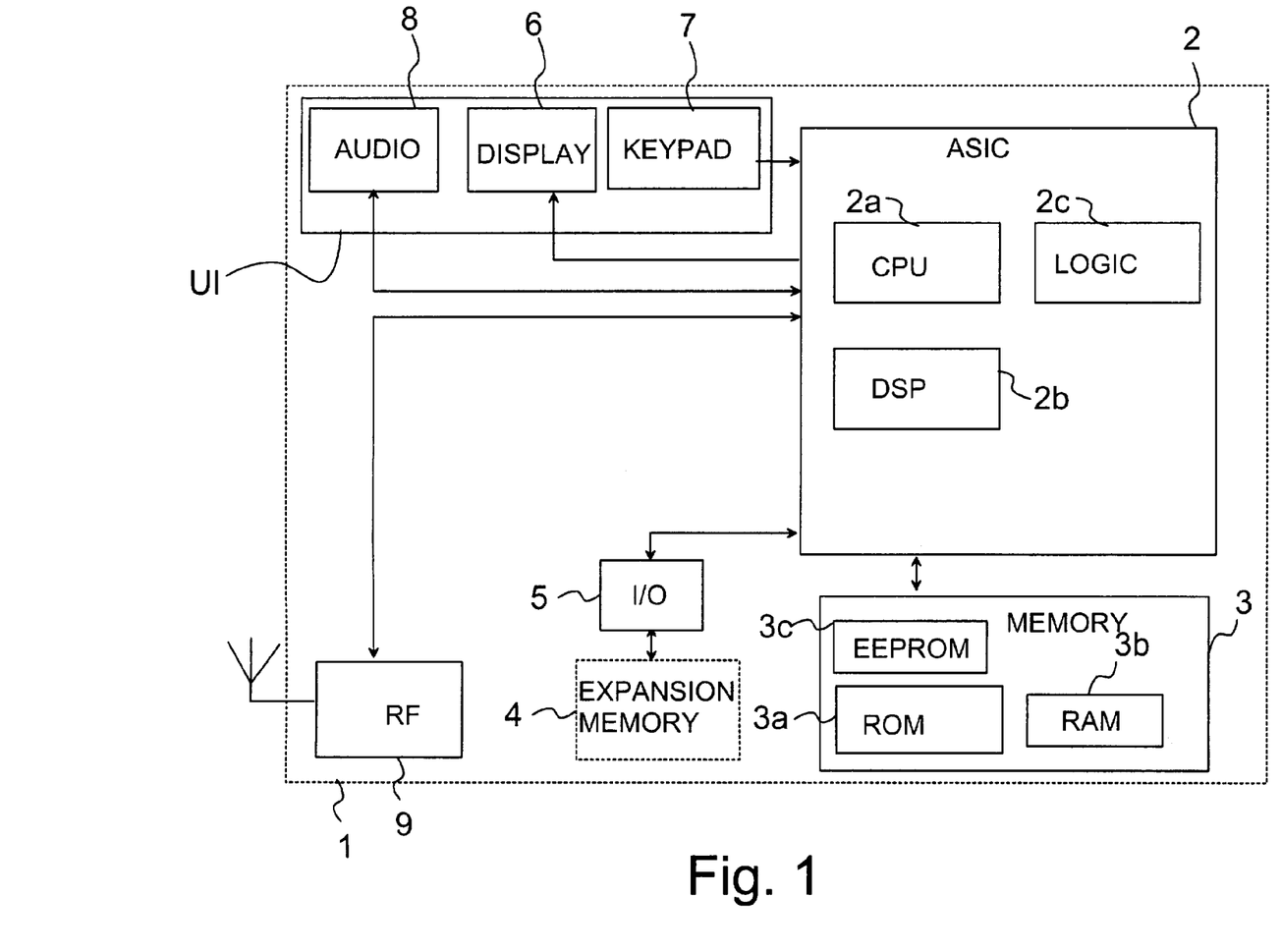
FIG. 1 shows an electronic device according to a preferred embodiment of the invention in a reduced block chart.

The electronic device 1 according to an advantageous embodiment of the invention, shown in FIG. 1, comprises a control block 2 containing at least one processor 2a (CPU) for running programs. Furthermore, the control block preferably comprises a digital signal processor 2b (DSP).

In addition, the control block 2 preferably comprises logic functions 2c, in which it is possible to implement, for example, at least part of the logic functions of the electronic device. In practical applications, the control block 2 can be implemented by using, for example, an application specific integrated circuit (ASIC). Furthermore, the electronic device 1 comprises memory means 3, which preferably contain at least a read only memory 3a (ROM) and a random access memory 3b (RAM). At least part of the read only memory can be an electrically erasable programmable read only memory 3c (EEPROM). It is also possible to connect a memory expansion to the electronic device 1 of FIG. 1, by placing a memory expansion block 4 in memory connection means 5. The memory expansion block 4 is, for example, a Flash memory card, but also other memory expansion means can be applied in connection with the invention, such as a data network 10, a fixed disk, or another storage means. Advantageously, the electronic device 1 is also provided with a user interface UI which preferably comprises a display 6, a keyboard 7, and audio means 8, such as an earpiece/a speaker and a microphone. The electronic device 1 according to an advantageous embodiment of the invention, shown in FIG. 1, also comprises communication means 9, such as means for performing mobile station functions, for example a GSM mobile station and/or a UMTS mobile station.

Figure 3:
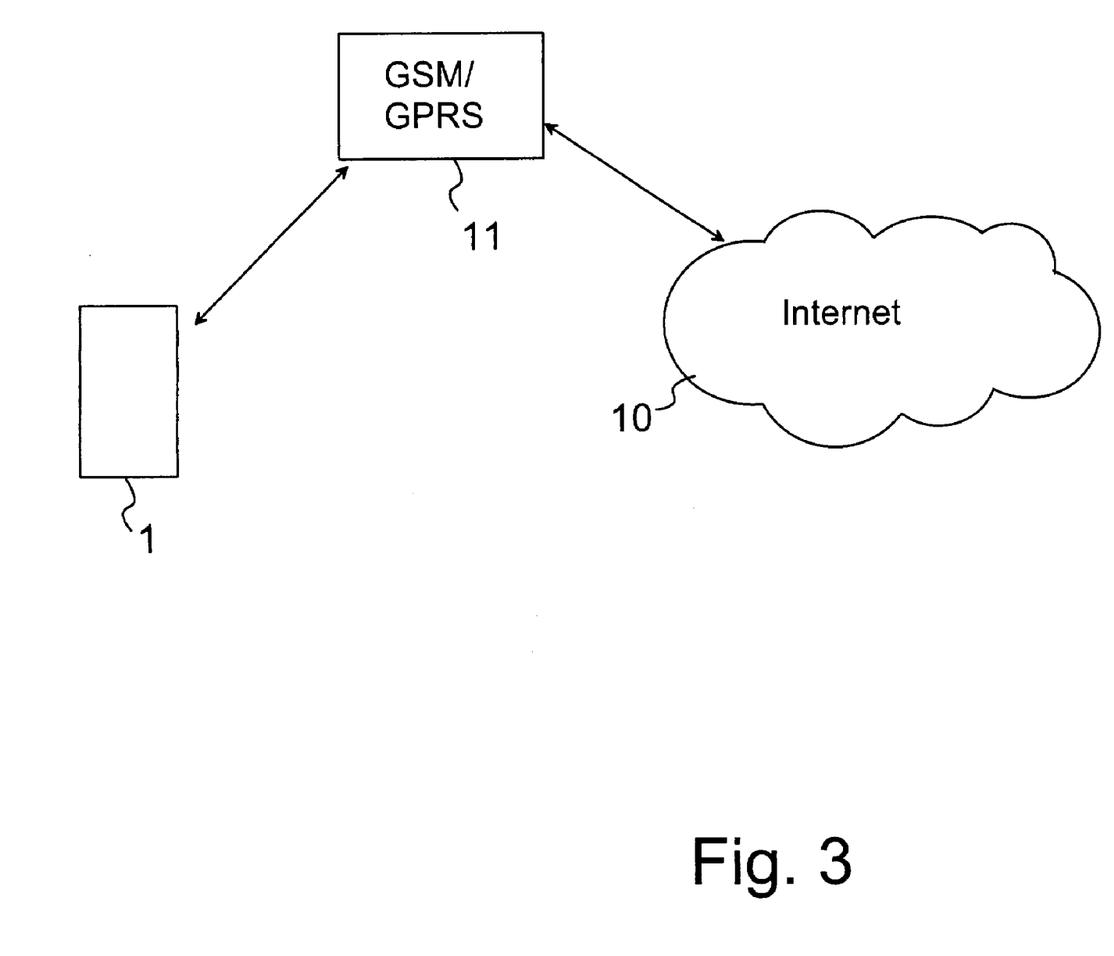
FIG. 3 shows a system, in which the invention can be applied.

In the following, it will be assumed that the random access memory 3b of the electronic device is used as a place for loading software, for the running of programs. The loadable software can be stored in the read only memory 3a, in the electrically erasable programmable read only memory 3c, in the memory expansion block 4, or the loading can be preferably performed by means of the communication means 9 and e.g. a mobile communication network 11 from an external data network 10 (FIG. 3), such as the Internet data network, or from a local data network, such as WLAN or Bluetooth™. Said memory 3b arranged for the processing of programs can, in this context, be also called the software processing memory, and in a corresponding manner, the memory in which the programs are stored for loading can be called the software storage memory. However, it will be obvious that in practical applications, the storage memory and the processing memory are not necessarily separate memories, but they can also be implemented at least partly in the same memory. It is also possible that the program is not actually loaded in the processing memory, but the storage memory is used as the processing memory; in other words, the program is processed directly from the storage memory.

Figure 2:
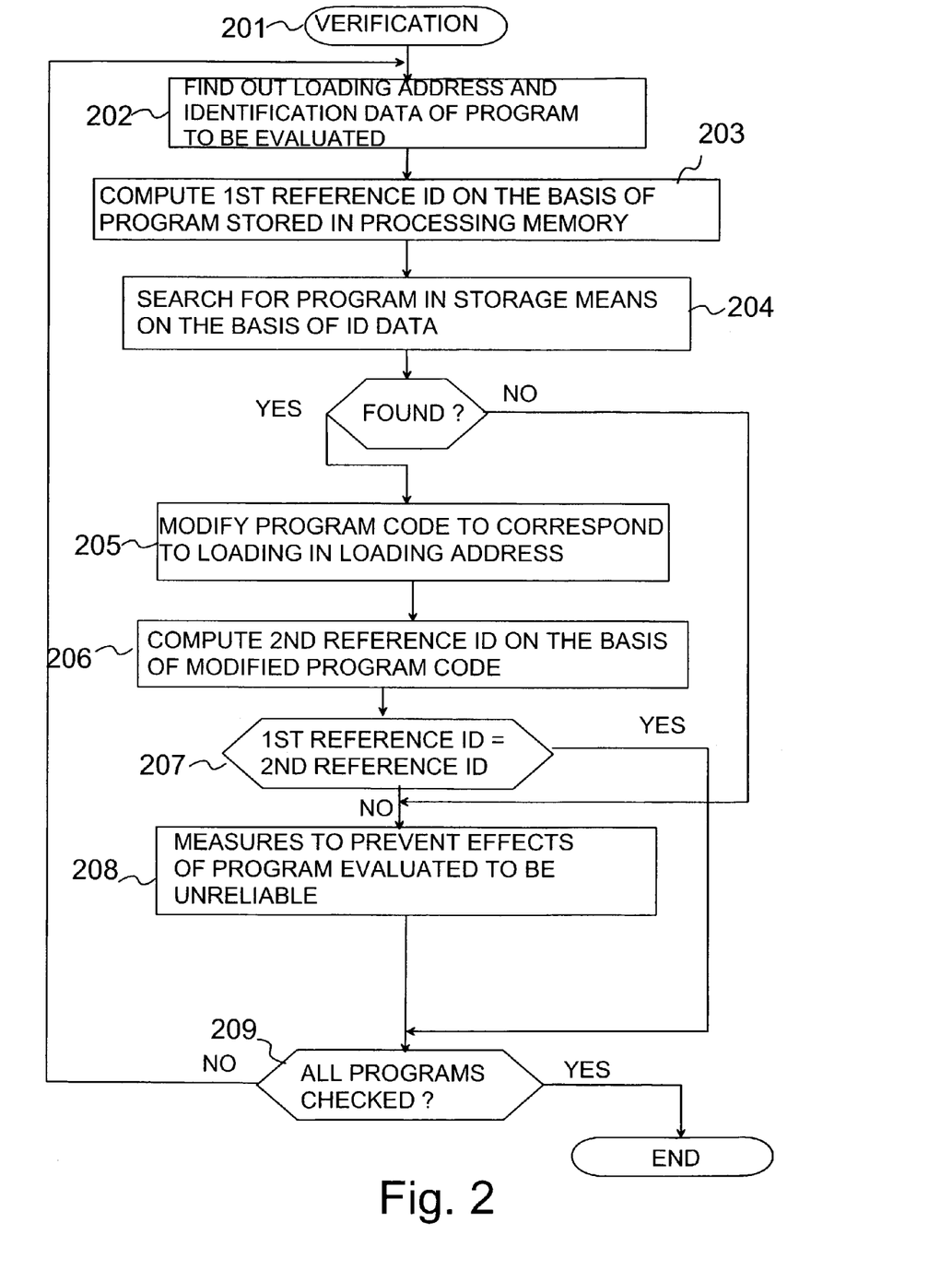
FIG. 2 shows the method according to a preferred embodiment of the invention in a simplified flow chart.

The security method according to an advantageous embodiment of the present invention functions in the following way. The operation is illustrated in the flow chart of FIG. 2, and an example system is illustrated in the reduced block chart of FIG. 3. Let us assume that the user wants to use a so-called trusted program, whose use requires that one has information, as reliable as possible, that the memory 3b used for the processing of the software of the electronic device 1 does not contain unreliable programs, i.e. virus programs or other programs which might have a harmful effect on the running of said program. The checking operations can be performed, for example, in such a way that the trusted program is provided with a program code used to perform checking operations of the method according to the invention, or the trusted program includes a call, for example, to a checking program stored in the read only memory 3a of the electronic device 1, in which the operations of the method according to the invention are performed. It is also possible to implement the performing of the checking operations by means of a system call or a service possibly implemented in the operating system, by means of a library program, or the like, wherein the trusted program includes a corresponding system call or a call to such a service or library program at the point where the checking operations must be performed. When a library program is used, one should, in one way or another, make sure that the library program itself is reliable.

Figure 4:
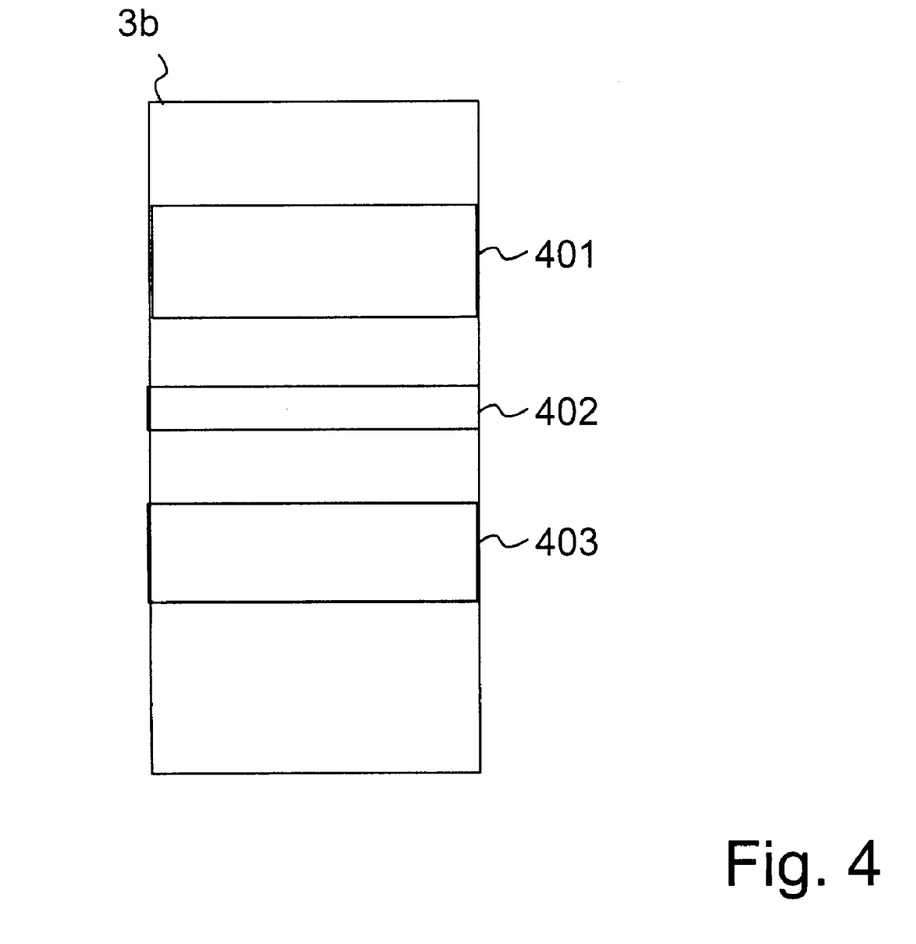
FIG. 4 shows the memory space of the memory of the electronic device in an example situation.

At the stage when the checking operations are performed, it is examined which programs are loaded in the software processing memory 3b of the electronic device 1. This information can be obtained, for example, from the operating system. Furthermore, the loading address of the programs loaded in the processing memory 3b is determined, which in this context means the memory address from which on the program code of the program is in the memory. However, it is obvious that the program is not necessarily loaded as one block in the memory but it can be loaded in several memory addresses. However, the means for loading the program, such as the operating system, is capable of determining all the memory spaces in which the program code is loaded. For clarity, however, it will be assumed hereinbelow that one program is loaded as one block, starting from a memory address (loading address). At different times of using the programs, however, this loading address may vary, for example because the same programs are not necessarily always loaded in the electronic device 1 and the loading of the programs is not necessarily always performed in the same order. Normally, the operating system places the program to be loaded in a memory area with a sufficient free memory space for loading the program at the moment of the loading. FIG. 4 shows the memory space of the software loading memory 3b in an example situation. Three programs 401, 402, 403 are loaded in the software loading memory 3b.

In the memory according to the invention, a suitable algorithm, such as a cryptographically strong hash function, is used for computing the first and the second reference digits. Such a hash function modifies an input m and returns a character string of fixed length, which is called the hash value h. Thus, mathematically $h=H(m)$. The length of the character string returned by the function is independent of the length of the input m. In this application, the program code is used as the input. One feature of the cryptographically strong hash function is that it can be considered as a unidirectional function, i.e., on the basis of the computed result it is, in practice, very difficult or even impossible to determine the input used in the computation. Furthermore, one of the properties of the hash function is that the probability that two different inputs would give the same character string as the result, is as low as possible. However, it is obvious that, instead of the hash function, it is possible to apply another method with corresponding properties in view of the input and the character string to be formed.

The steps of the method are preferably processed in a program specific way, wherein the examining is started from one program loaded in the memory, for example from the first program 401 in the situation of FIG. 4. The processor 2a preferably starts a security program stored in the read only memory 31 (block 201 in the flow chart of FIG. 2). This security program is provided with information about the loading address as well as the name or another identification of the program to be checked (block 202). After this, the check digits are computed. The first check digit is computed on the basis of the program code of the program stored in the memory (block 203). The second check digit is preferably computed in the following way. The checking program determines the name or other identifier of the program loaded in the memory, and retrieves the corresponding program from the storage memory, such as the memory expansion block 4 (block 204). It is also possible that the program is retrieved from an external data network 10 to the electronic device 1. After the program has been found, the modification of the program code is started, to modify it to correspond to the loading address of the program loaded in the memory (block 205). Consequently, in this modification step, the necessary memory addresses, jump addresses, links and the like are set to such values which they receive when the program is loaded to a given loading address. If the loading address varies, the above-mentioned values can be different, wherein it is not worthwhile to compute the second reference digit for such a program code, which is identical with the program code stored in the storage memory. Preferably, in connection with making the program code modifications, the second reference digit is computed by using the same algorithm as in the computation of the first reference digit (block 206). After the whole program code has been gone through, the second reference digit has also been formed.

By the above-described arrangement, it is possible to make the changes, which correspond to the loading of the program in the processing memory 3b, in the program code of the program stored in the storage memory. However, in this modification step, the program code is not loaded in said loading address. Also, the actual program stored in the storage memory, is not changed, but in this context, the changes to be made in the program code refer to temporary changes, which are necessary for applying the method. These temporary changes can, if necessary, be stored e.g. in the random access memory. However, it will be obvious that for making the changes and for computing the reference digit, the modification step can be taken, for example, as a parallel operation by modifying the program code and by always computing the second reference digit for a small memory area at a time. Thus, the need for memory capacity will be very small. After computing the reference digits, they are compared (block 207). If the comparison shows that the first and the second reference digits are identical, it is very probable that the checked program loaded in the memory corresponds to the same program stored in the memory means and the program can be trusted, if the origin of the program is known and it can be considered sufficiently reliable. However, if the comparison shows that the reference digits are not identical, it is possible that the software processing memory 3b of the electronic device 1 contains a program, which may be harmful, such as a virus program. Thus, measures are taken to prevent any damage possibly caused by the program, which is evaluated to be unreliable (block 208). For example, this checked program is stopped and deleted from the software processing memory 3b. The above-identified operations are iterated (block 209) until preferably all the programs 401, 402, 403 stored in the processing memory 3b have been checked.

It will be obvious that the mutual computing order of said first and second reference digits is of no significance, wherein either one of them can be computed first, or they can be computed in parallel. Also, the comparison of the reference digits can be performed in connection with the computation of the reference digits, wherein if a difference is possibly found between the first and the second reference digits, the computation and the comparison do not need to be completed.

The above-described steps of computing the first and the second reference digits are not necessarily needed, wherein in the method according to another preferred embodiment of the invention, the comparison is made directly on the basis of the program codes. Consequently, the program code stored in the processing memory is compared with the program code modified at the modification step. If the comparison shows that the program codes are identical, it can be assumed that the program in the processing memory has not been changed.

In a method according to a preferred embodiment of the invention, such a program loaded in the processing memory 3b is stopped and, for example, deleted from the processing memory or its running is interrupted for the time of the running of a trusted program, if no corresponding program stored in the storage memory is found for such a program loaded in the processing memory 3b. Furthermore, such programs loaded in the processing memory 3b are stopped or deleted from the processing memory 3b, which can be found to be possibly unreliable even without the security method according to the invention.

After all the necessary checking operations have been completed and the programs found to be unreliable have been deleted, it is possible to continue the processing of the trusted program in the normal way. If necessary, however, it is possible to display, for example on the display 6 of the electronic device, information if unreliable programs have been found in the processing memory 3b, wherein the user can take the necessary measures to examine such programs in more detail and possibly delete them from the electronic device 1.

In this context, it should be mentioned that in the above-described method, it is also possible, if necessary, to check that the program stored in the storage memory is reliable, before computing the second reference digit. This can be done, for example, by examining the authenticity and origin of a digital signature possibly stored in connection with the program. The purpose of this is to secure that the origin of the program stored in the storage memory is not other than that notified in connection with the program, provided that the secret key used in the generation of the digital signature is not known by others than the program manufacturer.

Another method for verifying the program stored in the storage memory is the following. At the stage of installing the program, for example the hash value is computed from the program and stored in a safe way, that is, in such a way that the hash value cannot be easily changed. In this, it is possible to use, for example, the digital signature, wherein the public key can be used at the stage of checking the program stored in the storage memory to verify the digital signature. In addition to verifying the digital signature, the reference digit is computed on the basis of the program code of the program stored in the storage memory, and the computed reference digit is compared with the safely stored reference digit. If these match, it can be assumed at a very high probability that the program stored in the storage means has not been changed after the installation step and it can be used for verifying the program stored in the processing memory.

Figure 5:
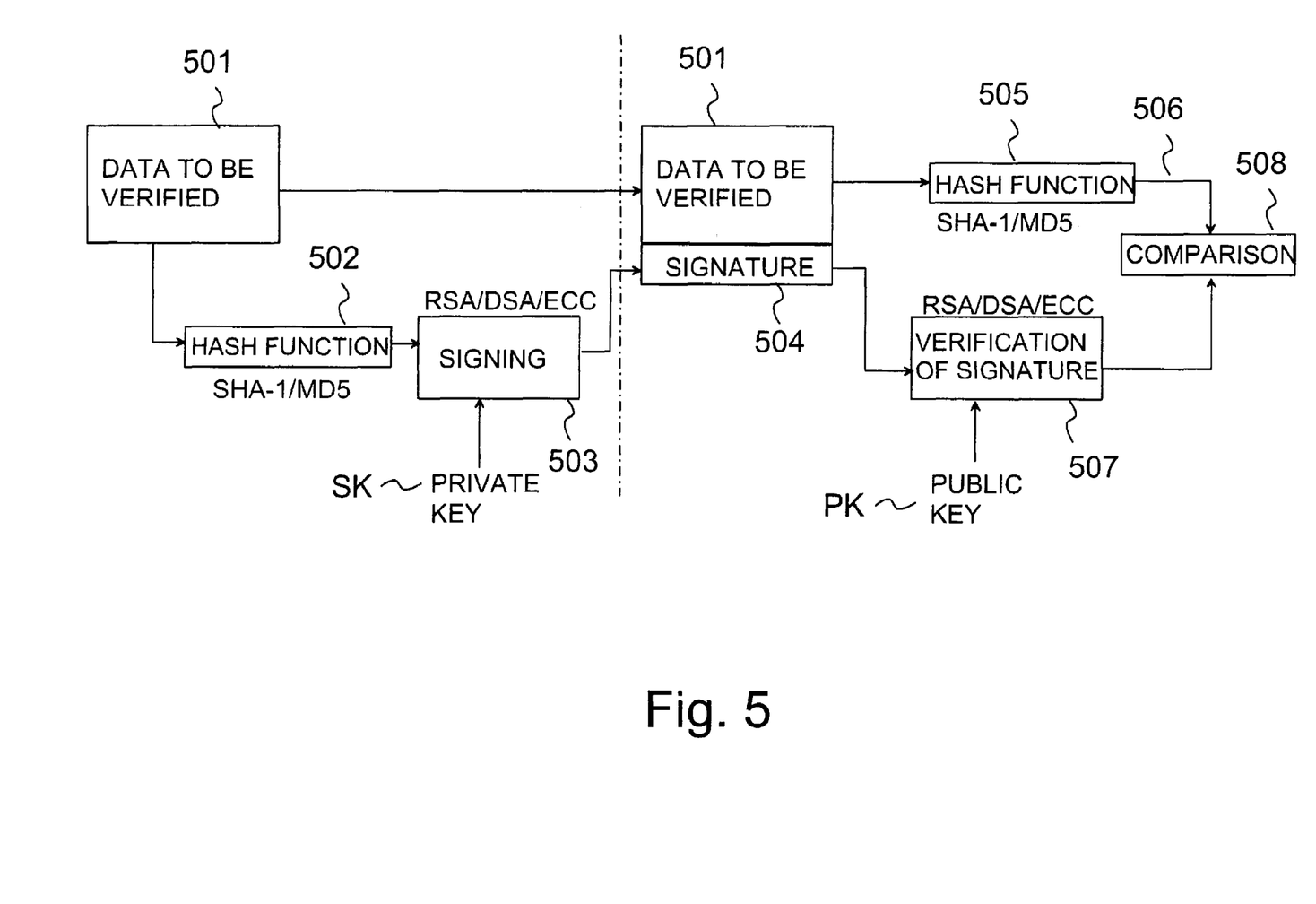
FIG. 5 shows a known principle on forming a digital signature.

For digital signatures, several systems have been developed, such as the RSA, DSA (Digital Signatures Algorithm), and ECC (Elliptic Curve Cryptography). These systems use algorithms, which compress the information to be signed, including SHA-1 (Secure Hash Algorithm) and MD5 (Message Digest 5) to be mentioned in this context. FIG. 5 shows, in a principle view, the processing of a digital signature, which is prior art known as such by a person skilled in the art. The data 501 to be signed, for example the program code of the program stored in the storage memory, is led to a block 502 performing a hash function (compressing function). After this, the hash data formed by the hash function is signed 503 with a secret key SK. The signature 504 is connected to the data 501 to be signed. At the stage of verifying the signed data, the data confirmed with the signature is led to a block 505 performing the hash function, for producing hash data 506. The signature is verified 507 by using a public key PK corresponding to the signatory's secret key, after which the hash data 506 is compared 508 with the data formed in the verification 507 of the signature. If the data match, the signed data can be relied on with a high probability.

The different steps of the method according to the present invention can be largely implemented by software, for example as program commands of the processor 2a. The method can thus be implemented as a program and stored on a suitable storage means, such as a Flash memory, a DVD, a CDROM, a data network 10, or the like. The program can be installed in the electronic device from said storage means.

It is obvious that the present invention is not limited solely to the above-presented embodiments but it can be modified within the scope of the appended claims.

The invention claimed is:

1. A method for evaluating the reliability of a program in an electronic device with at least a processing memory for processing programs, said program being stored in a storage memory, in which method the program is loaded into said processing memory to be processed, wherein the method comprises at least the following steps:
    a first determining step to determine information about the loading address of said program to be checked in the processing memory,
    a modification step, in which a search for a program corresponding to said program to be checked is made in the storage memory, wherein if the searched program is found, the program code of the searched program is modified to correspond to the loading of the program in the loading address determined in the first determining step, and
    an examining step, in which the conformity of the program loaded in the processing memory and the modified program is examined, wherein the result of the examining step is used in the evaluation of the reliability of the program to be checked.

2. The method according to claim 1, wherein in said examining step, the conformity of the program loaded in the processing memory and the modified program is examined by comparing the program codes of the program loaded in the processing memory and the modified program.

3. The method according to claim 1, wherein the method also comprises the following steps:
    a first computing step for computing a first reference digit by using the program code of the program to be checked, loaded in the processing memory,
    a second computing step for computing a second reference digit on the basis of the program code modified in the modification step,
wherein in said examining step, the conformity is examined by comparing said first and second reference digits.

4. The method according to claim 3, wherein a hash function is used in the computation of the first and second reference digits.

5. The method according to claim 3, wherein said first computing step, second computing step, and examining step are taken one after the other, wherein the first computing step and the second computing step are taken before the examining step.

6. The method according to claim 3, wherein the evaluation of the reliability is performed by dividing the program to be evaluated in parts, wherein in the first computing step, the first reference digit is computed on the basis of one part of the program stored in the processing memory; in the second computing step, the second reference digit is computed on the basis of the corresponding part of the modified program; and the first computing step, the second computing step and the examining step are iterated for the different parts of the program to be evaluated.

7. The method according to claim 1, wherein the steps of the method are iterated until all the programs loaded in the processing memory have been checked.

8. The method according to claim 1, wherein if the program searched in said modifying step is not found in the storage memory, checking operations are made to prevent the effect of the program to be checked on other programs of the electronic device.

9. The method according to claim 8, wherein as said checking operations, at least one of the following steps is taken:
   stopping the processing of the program to be checked,
   deleting the program to be checked from the processing memory.

10. The method according to claim 1, wherein if the comparison made at the examining step shows that the first and the second reference digits are not identical, the program to be checked is deleted from the processing memory.

11. The method according to claim 1, wherein the reliability of the program stored in the storage memory and corresponding to the program to be checked is evaluated.

12. A system for evaluating the reliability of a program in an electronic device with at least a processing memory for processing programs, and means for loading the program in said processing memory for processing, and which system comprises means for storing the program in a storage memory, the system further comprising:
   determining means for determining information about the loading address of the program to be checked, in the processing memory,
   searching means for searching for a program corresponding to said program to be verified, in the storage memory,
   modification means for modifying the program code of the searched program to correspond to the loading of the program in the loading address determined by the determining means, and
   examining means for examining the conformity of the program loaded in the processing memory and the modified program, wherein the result of the examining is arranged to be used in the evaluation of the reliability of the program to be checked.

13. The system according to claim 12, wherein the examining means comprise means for comparing the program codes of the program loaded in the processing memory and the modified program.

14. The system according to claim 12, wherein it also comprises:
   means for computing a first reference digit by using the program code of the program to be checked, loaded in the processing memory, and
   means for computing the second reference code on the basis of the program code modified by the modification means,
wherein the examining means comprise means for comparing said first and second reference digits.

15. The system according to claim 12, wherein the memory means of the electronic device are arranged to be used as said storage memory.

16. The system according to claim 12, comprising a data network, wherein the data network is arranged to be used as said storage memory.

17. The system according to claim 12, comprising means for evaluating the reliability of the program stored in the storage memory and corresponding to the program to be checked.

18. An electronic device comprising means for evaluating the reliability of a program, a processing memory for processing programs, and means for loading the program in said processing memory for processing, and the program to be checked being stored in a storage memory, the electronic device further comprising:
   determining means for determining information about the loading address of the program to be checked, in the processing memory,
   searching means for searching for a program corresponding to said program to be verified, in the storage memory,
   modification means for modifying the program code of the searched program to correspond to the loading of the program in the loading address determined by the determining means,
   examining means for examining the conformity of the program loaded in the processing memory and the modified program, wherein the result of the examining is arranged to be used in the evaluation of the reliability of the program to be checked.

19. The electronic device according to claim 18, wherein the examining means compnse means for comparing the program codes of the program loaded in the processing memory and the modified program.

20. The electronic device according to claim 18, wherein it also comprises:
   means for computing a first reference digit by using the program code of the program to be checked, loaded in the processing memory,
   means for computing the second reference code on the basis of the program code modified by the modification means,
wherein the examining means comprise means for comparing said first and second reference digits.

21. The electronic device according to claim 18, wherein it comprises means for downloading programs in the electronic device via a mobile communication network.

22. A mobile station comprising means for evaluating the reliability of a program, a processing memory for processing programs, and means for loading the program in said processing memory for processing, and the program to be checked being stored in a storage memory, the mobile station further comprising:
   determining means for determining information about the loading address of the program to be checked, in the processing memory,
   searching means for searching for a program corresponding to said program to be verified, in the storage memory,
   modification means for modifying the program code of the searched program to correspond to the loading of the program in the loading address determined by the determining means,
   examining means for examining the conformity of the program loaded in the processing memory and the modified program, wherein the result of the examining is arranged to be used in the evaluation of the reliability of the program to be checked.

23. A storage means comprising program commands which can be processed in an electronic device to evaluate the reliability of a program loaded in the processing memory of the electronic device, said program being stored in a storage memory, and which electronic device comprises means for loading the program in said processing memory for processing, wherein the storage means comprises program commands for taking the following steps:

- a determining step to determine information about the loading address of said program to be checked in the processing memory,
- a modification step, in which a search for a program corresponding to said program to be checked is made in the storage memory, wherein if the searched program is found, the program code of the searched program is modified to correspond to the loading of the program in the loading address determined in the first determining step, and
- an examining step, in which the conformity of the program loaded in the processing memory and the modified program is examined, wherein the result of the examining step is used in the evaluation of the reliability of the program to be checked.

* * * * *

UNITED STATES PATENT AND TRADEMARK OFFICE
CERTIFICATE OF CORRECTION

PATENT NO. : 7,065,680 B2  Page 1 of 1
APPLICATION NO. : 10/464106
DATED : June 20, 2006
INVENTOR(S) : Janne Mantyla It is certified that error appears in the above-identified patent and that said Letters Patent is hereby corrected as shown below:

1. At column 12, line 27, claim 19, line 2, please delete "compnse" and replace with --comprise--.

Signed and Sealed this

Seventh Day of November, 2006

JON W. DUDAS
*Director of the United States Patent and Trademark Office*